Aug. 24, 1943.                H. M. WOELFEL                2,327,974
                     PREFORMED MULTIPANE GLAZING UNIT
                            Filed Jan. 30, 1942
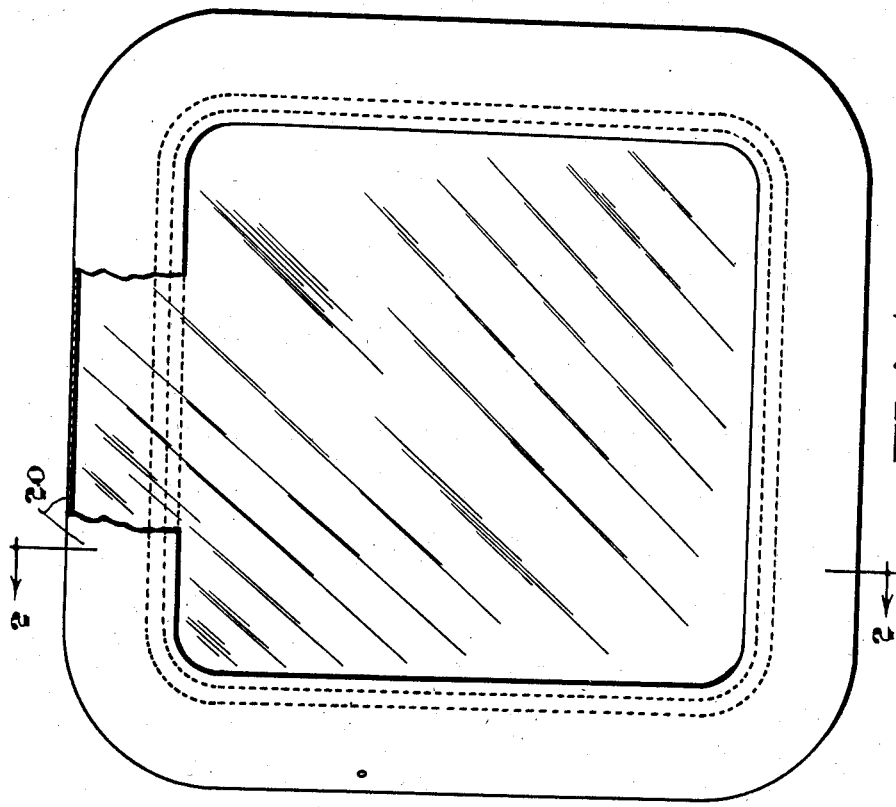
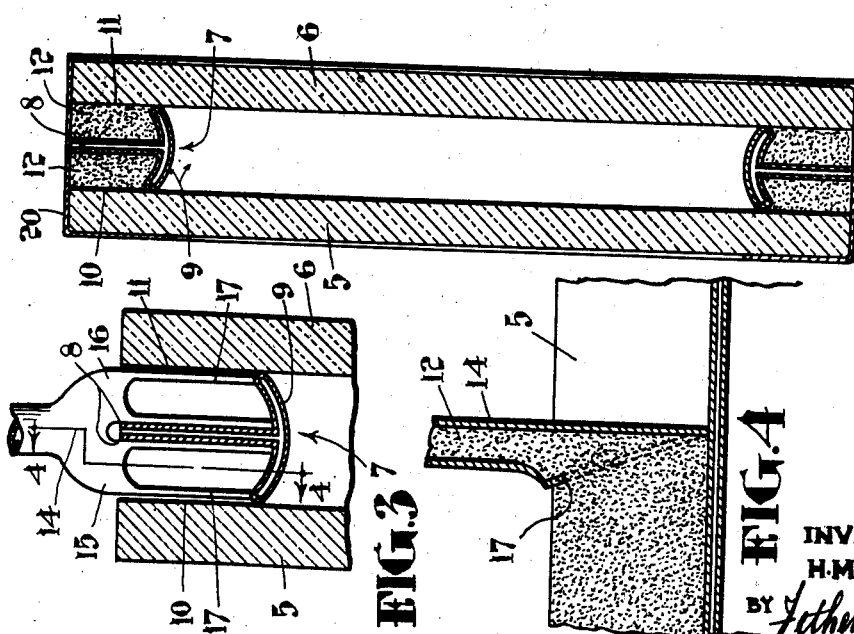
INVENTOR
H. M. WOELFEL
ATTORNEYS Patented Aug. 24, 1943

2,327,974

UNITED STATES PATENT OFFICE 2,327,974

PREFORMED MULTIPANE GLAZING UNIT

Harold M. Woelfel, Montreal, Quebec, Canada, assignor to The Robert Mitchell Co. Limited, Montreal, Quebec, Canada Application January 30, 1942, Serial No. 428,917

1 Claim. (Cl. 20—56.5)

This invention relates to preformed multipane glazing units and has particular reference to units comprising two transparent panes having their marginal portions cemented together to form an enclosed cell space. The improvements provided by the present invention are applicable to this type of multi-pane glazing unit regardless of whether the cell space between the transparent panes is to be hermetically sealed or is to be vented to the outside atmosphere.

The main feature of this invention resides in the provision of an improved form of metallic spacer frame cemented in place between the marginal portions of the transparent panes to prevent collapse of the unit by external pressure. This frame is formed with T-shaped side members, the stem portions of which are directed outwardly, and is initially placed between the transparent panes so that the outer marginal edge of the stem portion of each frame member is substantially co-planer with the corresponding outer marginal edges of the transparent panes. The stem portions of the frame members are made of substantial length so that the head portion of each frame member is located inwardly a substantial distance from the corresponding marginal portions of the panes. After the spacer frame has been fitted in place between the transparent panes clamps are applied to the latter to hold the parts in place during the cementing operation which consists in extruding streams of plastic cementitious sealing material into channels or spaces reserved between the inner surfaces of the panes and the opposing side surfaces of the stem portions of the spacer frame. The said channels or spacers extend uninterruptedly around the marginal portions of the pane and the sealing material is laid therein in the form of continuous strips completely filling said channels or spaces. This provides an improved type of multi-pane glazing unit in which the transparent panes are firmly bonded to both the stem and head portions of the spacer frame by the cementitious plastic material which is preferably one that does not harden to brittleness but retains a relatively soft, tacky and non-flowing condition and possesses considerable resiliency.

The spacer frame is preferably made of thin flexible metal and the head portion is transversely curved so that, by reason of such curvature, said head portion is capable of flexing in response to inward pressure of the transparent pane. Such flexure of the head portion of the spacer frame does not disrupt the bond between this portion of the spacer frame and the sealing material since the resiliency of the sealing material is sufficient to prevent this. I am aware that the interposition of metal spacers between the transparent panes of preformed multi-pane glazing units is not broadly new. However, the spacer frame of my invention differs from those previously used in that it provides, in conjunction with the marginal portions of the transparent panes, a plurality of channels in which the sealing material may be laid to provide an exceptionally strong bond between the spacer frame and the panes. In the case of a T-shaped frame two channels are provided lying at opposite sides of the stem portion of the frame and the inner or bottom walls of these channels are formed by the head portion of the frame which serves as a stop for the sealing material as the latter is forced into the channels during the sealing operation. So far as I am aware it is new to provide a spacer frame which, when fitted between marginal portions of the transparent panes provides a plurality of channels which are open at the marginal portions of the panes to receive the sealing material.

Proceeding now to a more detailed description of this invention reference will be had to the accompanying drawing, wherein—

Fig. 1 is a side elevation, partly broken away, of a multi-pane glazing unit constructed in accordance with my invention.

Fig. 2 is a sectional view taken substantially along the line 2—2 of Fig. 1.

Fig. 3 is a view illustrating the manner in which the plastic sealing material is extruded into the channels formed by and between the transparent panes and the interposed spacer frame.

Fig. 4 is a sectional view taken along the line 4—4 of Fig. 3.

As shown in the drawing, my improved glazing unit comprises a pair of transparent panes 5 and 6 having their marginal portions cemented to an interposed spacer frame 7 which serves to prevent collapse of the unit by external pressure. In the present instance the frame 7 is shown as a substantially rectangular frame which is substantially T-shaped in cross section, the stem portion 8 of each side member of the frame being directed outwardly from the head portion 9. The spacer frame 7 is initially arranged between the transparent panes 5 and 6 as shown in Fig. 2, it being noted that the head portion 9 of each side member of the frame is disposed a substantial distance inwardly from the adjacent marginal portions of the panes 5 and 6 and that the outer end of the stem portion 8 of each side member of the frame is substantially co-planar with the adjacent marginal edges of said panes. After the pacer frame has been thus arranged between the panes 5 and 6 the latter are temporarily clamped against the head portions 9 of the frame in any suitable manner so as to hold the parts against accidental displacement during the sealing operation hereinafter described. For example, the holding of the transparent panes 5 and 6 of the spacer frame in their proper relative positions during the cementing operations may be accomplished by the use of any suitable type of clamps adapted to be fitted over the panes 5 and 6 to press them against the head portion 9 of the spacer frame members. As clearly shown in Fig. 3 the stem portions 8 of the spacer frame are spaced from the inner surfaces of the transparent panes 5 and 6 to provide channels 10 and 11 which are filled with cementitious plastic sealing material as indicated at 12 in Fig. 2. This sealing material 12 is preferably extruded into the channels 10 and 11 by means of the forked extrusion nozzle indicated at 14 in Figs. 3 and 4. This nozzle is bifurcated to provide branches 15 and 16 which straddle the stem portions 8 of the spacer frame when inserted in the channels 10 and 11. The cementitious material 12 is forced into the channels 10 and 11 through the delivery openings 17 of the nozzle, it being understood that, during this operation, the glazing unit is moved relative to the nozzle or vice versa so that the sealing material is laid in each of the channels 10 and 11 in the form of a continuous sealing strip completely filling said channels. Aside from the use of the divided nozzle shown at 14 the present invention is not particularly concerned with the specific construction of the apparatus by which the relative movement necessary between the nozzle and the glazing unit is effected during the filling of the channels 10 and 11 with the sealing material. An example of a suitable apparatus for use in this connection is disclosed in the co-pending application of H. M. Woelfel, filed May 13, 1938, under Serial No. 207,719.

The cementing operation required in connection with the present invention may be performed with the aid of the apparatus disclosed in said co-pending application by simply substituting the herein described bifurcated nozzle 14 for the single delivery opening nozzle shown and described in said application. The clamps shown in said co-pending application for holding the transparent panes in spaced relation during the cementing operation may also be used in accordance with the present invention as the clamping means for holding the panes 5 and 6 in assembled relation with the interposed spacer frame 7.

In the present instance I have shown a spacer frame 7 in which the stem and head portions 8 and 9 are formed by bending a single sheet of metal so that these portions of the frame are of double thickness, the two thicknesses of each portion being spaced apart as will be apparent from Figs. 2 and 3. This method of constructing the T-shaped members gives it a certain amount of added springiness which has been found desirable to take care of maximum flexing of the glass panes 5 and 6 when the glazing unit is in service. It will be understood, however, that the stem and head portions of the spacer frame may be of single thickness. It will also be understood, that the spacer frame may be made of cast metal instead of sheet metal. The latter is preferred since it enables the head portion of the frame to be transversely curved as shown in Figs. 2 and 3 and such transverse curvature, in the case of a sheet metal frame, is of advantage in that it permits the marginal portions of the T-head 9 to be deflected inwardly by external pressure on the transparent panes 5 and 6.

During the cementing operation very thin layers of the cementitious material 12 are forced inwardly between the inner surfaces of the panes 5 and 6 and lateral edges of the head portions 9 of the spacer frame members so that such lateral edges are thus bonded to the adjacent portions of the transparent panes. I have also found that the division of the sealing material 12 into two strips lying between the stem portion of the spacer frame and the opposing inner surfaces of the transparent panes 5 and 6 gives an exceptionally good bonding of the component parts of the glazing unit.

In some cases the cementing operation is followed by the application of thin and highly flexible sheets of metal foil, preferably aluminum foil, which are folded about the marginal portions of the glazing unit as indicated at 20 and cemented in place in intimate contact with the engaging outer surfaces of the glass panes and the exposed surfaces of the interposed sealing composition. The purpose of the foil 20 is to prevent the sealing compound 12 being impaired by the deleterious action of oils and solvents contained in the putty and other caulking compounds usually employed for securing the glazing unit in position within a wooden or metal frame. The cementing agent employed for securing the foil 20 in place should have the characteristics specified in the co-pending U. S. application of S. G. Lipsett, filed Aug. 29, 1938, under Serial No. 227,405. In the present instance I have shown a glazing unit in which the cell space between the transparent panes 5 and 6 is hermetically sealed but it will be understood that, if desired, this cell space may be vented to the atmosphere in any suitable manner such, for example, as the particular manner disclosed in the aforesaid Lipsett application.

Having thus described my invention, what I claim is:

A preformed multi-pane glazing unit comprising a pair of transparent panes, a T-section spacer interposed between the marginal portions of said panes with the stem portion of the T-section extending outwardly from the head portion in spaced relation to the inner surfaces of said panes, said spacer being made of thin, flexible, resilient metal and having its head portion transversely curved to increase the flexibility thereof and a sealing material filling the space between the stem portion of the T-section and the opposing surfaces of said panes and serving to bond the latter to both the stem and head portions of the T-section.

HAROLD M. WOELFEL.